US010899017B1

(12) United States Patent
De Sapio et al.

(10) Patent No.: US 10,899,017 B1
(45) Date of Patent: Jan. 26, 2021

(54) SYSTEM FOR CO-ADAPTATION OF ROBOT CONTROL TO HUMAN BIOMECHANICS

(71) Applicant: HRL Laboratories, LLC, Malibu, CA (US)

(72) Inventors: Vincent De Sapio, Westlake Village, CA (US); Heiko Hoffmann, Simi Valley, CA (US)

(73) Assignee: HRL Laboratories, LLC, Malibu, CA (US)

( * ) Notice: Subject to any disclaimer, the term of this patent is extended or adjusted under 35 U.S.C. 154(b) by 387 days.

(21) Appl. No.: 16/033,138

(22) Filed: Jul. 11, 2018

Related U.S. Application Data
(60) Provisional application No. 62/541,060, filed on Aug. 3, 2017.

(51) Int. Cl.
*B25J 11/00* (2006.01)
*B25J 9/16* (2006.01)

(52) U.S. Cl.
CPC ........... *B25J 11/008* (2013.01); *B25J 9/1671* (2013.01); *B25J 9/1697* (2013.01)

(58) Field of Classification Search
CPC ...... B25J 11/008; B25J 9/1671; B25J 9/1697; G05B 2219/40324; G05B 2219/40359; G05B 2219/40202; G05B 2219/40198; G05B 2219/40391; G05B 2219/40195; G05B 2219/40201
See application file for complete search history.

(56) References Cited

U.S. PATENT DOCUMENTS

| 9,364,951 | B1 | 6/2016 | De Sapio et al. | |
|---|---|---|---|---|
| 2007/0146371 | A1* | 6/2007 | Dariush | B25J 9/1602 345/474 |
| 2007/0255454 | A1* | 11/2007 | Dariush | G06N 3/008 700/245 |
| 2009/0074252 | A1* | 3/2009 | Dariush | G11C 16/349 382/107 |
| 2009/0099738 | A1* | 4/2009 | Danko | E02F 3/437 701/50 |
| 2009/0118863 | A1* | 5/2009 | Dariush | B25J 9/1666 700/255 |

(Continued)

OTHER PUBLICATIONS

Anderson, F. C., & Pandy, M. G. (2001). Dynamic Optimization of Human Walking. Journal Biomechanical Engineering , 123 (5), pp. 381-390.

(Continued)

*Primary Examiner* — Dale Moyer
(74) *Attorney, Agent, or Firm* — Tope-McKay & Associates

(57) ABSTRACT

Described is a system for co-adaptation of robot control to human biomechanics. During operation, the system receives joint angle and joint velocity of a human and co-robot and generates estimated internal states of the human. A task space motion plan is then generated for the co-robot based on a specified cooperative task and estimated internal states and joint angle and joint velocity of the human. Joint torque commands are then generated based on the task space motion plan and joint angle and joint velocity of the human and co-robot. Motion of the co-robot is then controlled, such as causing the co-robot to actuate one or more actuators to move based on the joint torque commands.

21 Claims, 7 Drawing Sheets

(56) References Cited

U.S. PATENT DOCUMENTS

| | | | | |
|---|---|---|---|---|
| 2009/0175540 | A1* | 7/2009 | Dariush | G06K 9/00362 382/195 |
| 2009/0252423 | A1* | 10/2009 | Zhu | G06K 9/00201 382/209 |
| 2010/0215271 | A1* | 8/2010 | Dariush | G06K 9/4671 382/180 |
| 2013/0013112 | A1* | 1/2013 | Darish | B62D 57/032 700/259 |
| 2013/0054021 | A1* | 2/2013 | Murai | G06N 3/008 700/245 |
| 2018/0032868 | A1* | 2/2018 | Dani | G06T 7/285 |
| 2018/0099411 | A1* | 4/2018 | Ayusawa | B25J 9/1605 |
| 2019/0105779 | A1* | 4/2019 | Einav | B25J 9/1697 |

OTHER PUBLICATIONS

Anderson, F. C., & Pandy, M. G. (2001). Static and dynamic optimization solutions for gait are practically equivalent. Journal of Biomechanics, 34, pp. 153-161.

Baratta, R., Solomonow, M., Zhou, B. H., Letson, D., Chuinard, R., & R., D. (1988). Muscular coactivation. The role of the antagonist musculature in maintaining knee stability. The American Journal of Sports Medicine, 16 (2), pp. 113-122.

Bizzi, E., Mussa-Ivaldi, F., & Giszter, S. (1991). Computations underlying the execution of movement: A biological perspective. Science, 253, pp. 287-291.

Bunderson, N. E., Bingham, J. T., Sohn, M. H., Ting, L. H., & Burkholder, T. J. (2012). Neuromechanic: A computational platform for simulation and analysis of the neural control of movement. International Journal for Numerical Methods in Biomedical Engineering, 28 (10), pp. 1015-1027.

Chang, K.-S., Holmberg, R., & Khatib, O. (2000). The augmented object model: cooperative manipulation and parallel mechanism dynamics. Proceedings of the IEEE International Conference on Robotics and Automation, 1, pp. 470-475.

Crowninshield, R. D., & Brand, R. A. (1981). A physiologically based criterion of muscle force prediction in locomotion. Journal of Biomechanics, 14, pp. 793-801.

Damsgaard, M., Rasmussen, J., Christensen, S., Surma, E., & de Zee, M. (2006). Analysis of musculoskeletal systems in the AnyBody Modeling System. Simulation Modelling Practice and Theory, 14, pp. 1100-1111.

Davy, D. T., & Audu, M. L. (1987). A dynamic optimization technique for predicting muscle forces in the swing phase of gait. Journal of Biomechanics, 20 (2), pp. 187-201.

De Sapio, V. (2014). An approach for goal-oriented neuromuscular control of digital humans in physics-based simulations. International Journal of Human Factors Modelling and Simulation, 4 (2), pp. 121-144.

De Sapio, V. (2011). Task-level control of motion and constraint forces in holonomically constrained robotic systems. Proceedings of the 18th World Congress of the International Federation of Automatic Control. Milan, pp. 14622-14629.

De Sapio, V., & Park, J. (2010). Multitask constrained motion control using a mass-weighted orthogonal decomposition. Journal of Applied Mechanics, 77 (4), pp. 1-10.

De Sapio, V., & Srinivasa, N. (2015). A methodology for controlling motion and constraint forces in holonomically constrained systems. Multibody System Dynamics, 33, pp. 179-204.

Delp, S. L., Anderson, F. C., Arnold, S., A., Loan, P., Habib, A., et al. (2007). OpenSim: Open-source software to create and analyze dynamic simulations of movement. IEEE Transactions on Biomedical Engineering, 54 (11), pp. 1940-1950.

Delp, S. L., Loan, J. P., Hoy, M. G., Zajac, F. E., Topp, E. L., & Rosen, J. M. (1990). An interactive graphics-based model of the lower extremity to study orthopaedic surgical procedures. IEEE Transactions on Biomedical Engineering, 37, pp. 757-767.

Gomi, H., & Osu, R. (1998). Task-Dependent Viscoelasticity of Human Multijoint Arm and Its Spatial Characteristics for Interaction with Environments. The Journal of Neuroscience, 18 (21), pp. 8965-8978.

Hill, A. V. (1938). The heat of shortening and dynamics constants of muscles. Proceedings of the Royal Society B, 126 (843), pp. 136-195.

Hogan, N. (1984). Adaptive Control of Mechanical Impedance by Coactivation of Antagonist Muscles. IEEE Transactions on Automatic Control, 29 (8), pp. 681-690.

Hogan, N. (1985). Impedance Control: An Approach to Manipulation (Parts I, II, and III). Journal of Dynamic Systems, Measurement, and Control, 107, pp. 1-24.

Hogan, N. (1987). Stable execution of contact tasks using impedance control. Proceedings of the 1987 IEEE International Conference on Robotics and Automation, 4, pp. 1047-1054.

Huston, R. L., Liu, C. Q., & Li, F. (2003). Equivalent control of constrained multibody systems. Multibody System Dynamics, 10 (3), pp. 313-321.

Ikeura, R., & Inooka, H. (1995). Variable Impedance Control of a Robot for Cooperation with a Human. Proceedings of the 1995 IEEE International Conference on Robotics and Automation, 3, pp. 3097-3102.

Kaplan, M. L., & Heegaard, J. H. (2001). Predictive algorithms for neuromuscular control of human locomotion. Journal of Biomechanics, 34, pp. 1077-1083.

Khatib, O. (1987). A unified approach to motion and force control of robot manipulators: the operational space formulation. International Journal of Robotics Research, 3 (1), pp. 43-53.

Khatib, O. (1995). Inertial properties in robotic manipulation: an object level framework. International Journal of Robotics Research, 14 (1), pp. 19-36.

Khatib, O., Yokoi, K., Chang, K., Ruspini, D. C., Holmberg, R., Casal, A., et al. (1995). Force Strategies for Cooperative Tasks in Multiple Mobile Manipulation Systems. Proceedings of the International Symposium on Robotics Research, pp. 333-342.

Kosuge, K., & Oosumi, T. (1996). Decentralized control of multiple robots handling an object. Proceedings of the 1996 IEEE/RSJ International Conference on Intelligent Robots and Systems, 1, pp. 318-323.

Lewis, F. L., Abdallah, C. T., & Dawson, D. M. (1993). Control of Robot Manipulators. New York: Macmillan Publishing Company, pp. 185-208.

McGuan, S. (2001). From Bubblemen to Skeletons. SAE Digital Human Modeling for Design and Engineering Conference, pp. 1-9.

Mussa-Ivaldi, F. A., Hogan, N., & Bizzi, E. (1985). Neural, mechanical and geometric factors subserving arm posture in humans. Journal of Neuroscience, 5, pp. 2732-2743.

Neptune, R. R. (1999). Optimization algorithm performance in determining optimal controls in human movement analyses. Journal of Biomechanical Engineering, 121, pp. 249-252.

Oomens, C. W., Maenhout, M., van Oijen, C. H., Drost, M. R., & Baaijens, F. P. (2003). Finite element modelling of contracting skeletal muscle. Philosophical Transactions of the Royal Society B, 358 (1437), pp. 1453-1460.

Patton, J. L., & Mussa-Ivaldi, F. A. (2002). Patton, J. L., & Mussa-Ivaldi, F. A. (2002). Linear combinations of nonlinear models for predicting human-machine interface forces. Biological Cybernetics, 86, pp. 73-87.

Pereira, G. A., Kumar, V., & Campos, M. F. (2004). Decentralized Algorithms for Multirobot Manipulation Via Caging. International Journal of Robotics Research, 23 (7-8), pp. 783-795.

Sentis, L. (2010). Compliant Control of Whole-body Multi-contact Behaviors in Humanoid Robots. In K. Harada, E. Yoshida, & K. Yokoi (Eds.), Motion Planning for Humanoid Robots, pp. 29-66, Springer.

Sentis, L., & Khatib, O. (2006). A Whole-Body Control Framework for Humanoids Operating in Human Environments. Proceedings of the 2006 IEEE Internactional Conference on Robotics and Automation. Orlando, pp. 2641-2648.

Sentis, L., & Khatib, O. (2005). Synthesis of Whole-body Behaviors Through Hierarchical Control of Behavioral Primitives. International Journal of Humanoid Robotics, 2 (4), pp. 505-518.

(56) References Cited

OTHER PUBLICATIONS

Shadmehr, R. (1993). Control of equilibrium position and stiffness through postural modules. Journal of Motor Behavior, 25 (3), pp. 228-241.

Shadmehr, R., Mussa-Ivaldi, F. A., & E., B. (1993). Postural force fields of the human arm and their role in generating multi-joint movements. Journal of Neuroscience, 13 (1), pp. 45-62.

Shin, D., Quek, Z. F., Phan, S., Cutkosky, M. R., & Khatib, O. (2011). Instantaneous Stiffness Effects on Impact Forces in Human-Friendly Robots. Proceedings of the 2011 IEEE/RSJ International Conference on Intelligent Robots and Systems, pp. 2998-3003, San Francisco.

Tee, K. P., Franklin, D. W., Kawato, M., Milner, T. E., & Burdet, E. (2010). Concurrent adaptation of force and impedance in the redundant muscle system. Biological Cybernetics, 102 (1), pp. 31-44.

Teran, J., S. Blemker, S., Ng Thow Hing, V., & Fedkiw, R. (2003). Finite Volume Methods for the Simulation of Skeletal Muscle. Eurographics/SIGGRAPH Symposium on Computer Animation, pp. 68-74 and 365.

Thelen, D. G., & Anderson, F. C. (2006). Using computed muscle control to generate forward dynamic simulations of human walking from experimental data. Journal of Biomechanics, 39, pp. 1107-1115.

Thelen, D. G., Anderson, F. C., & Delp, S. L. (2003). Generating dynamic simulations of movement using computed muscle control. Journal of Biomechanics, 36 (3), pp. 321-328.

Tsumugiwa, T., Yokogawa, R., & Hara, K. (2002). Variable impedance control based on estimation of human arm stiffness for human-robot cooperative calligraphic task. Proceedings of the 2002 IEEE International Conference on Robotics and Automation, 1, pp. 644-650.

Zajac, F. E. (1993). Muscle coordination of movement: A perspective. Journal of Biomechanics, 26 (1), pp. 109-124.

Zinn, M., Khatib, O., Roth, B., & Salisbury, J. K. (Jun. 2004). Playing It Safe: A New Actuation Concept for Human-Friendly Robot Design. IEEE Robotics and Automation Magazine, 11 (2), pp. 12-21.

Stroupe, A., Huntsberger, T., Okon, A., Aghazarian, H., & Robinson, M. (2005). Behavior-based multi-robot collaboration for autonomous construction tasks. Proceedings of the 2005 IEEE/RSJ International Conference on Intelligent Robots and Systems, pp. 1495-1500.

Roetenberg, D., Luinge, H., & Slycke, P. (2009). Xsens MVN: full 6DOF human motion tracking using miniature inertial sensors. Xsens Technologies, pp. 1-9.

\* cited by examiner

SYSTEM FOR CO-ADAPTATION OF ROBOT CONTROL TO HUMAN BIOMECHANICS

CROSS-REFERENCE TO RELATED APPLICATIONS

This application claims the benefit of and is a non-provisional patent application of U.S. 62/541,060, filed on Aug. 3, 2017, the entirety of which is hereby incorporated by reference.

BACKGROUND OF INVENTION

(1) Field of Invention

The present invention relates to robot control system and, more specifically, to a system for co-adaptation of robot control to human biomechanics when the robot is collaborating with a human.

(2) Description of Related Art

As technology advances, robots will be increasingly working alongside or otherwise collaborating with humans. As such, systems need to be developed to allow such robots to work effectively with their human collaborators when performing cooperative tasks. Current frameworks use contact alone as a constraint for motion control in cooperative tasks. However, this neglects important information about the human physiological structure and the complex interplay of muscles spanning the skeletal system. Configuration space (joint space control) is the most common scheme for motion control of robotic systems.

In contrast to joint space control, the operational space approach was introduced (see the List of Incorporated Literature References, Literature Reference Nos. 24 and 25) to simplify the control problem by specifying a task space rather than a joint space control objective. Task space refers to the space of motion control coordinates relevant for a given task. As one simple example, the task space for controlling a robot arm can be defined as the Cartesian space used to describe the position of the end effector. Using the operational space approach, the configuration space dynamics of a multibody system are mapped into an appropriate task space. This is advantageous for control purposes since the operational space method provides task-level dynamic models and structures for decoupled task and posture control. This allows for posture objectives to be controlled without dynamically interfering with the primary task(s). A task-level decomposition of motion is particularly amenable to cooperative robot control.

Constrained motion control is fundamental to cooperative robot control since constraints arise ubiquitously in the performance of cooperative tasks. Huston et al. have addressed constraints in robotic systems in the context of equivalent motion control (see Literature Reference No. 21). This approach, while providing insight into how certain generalized forces can be nullified by system constraints, is rooted in a joint space analysis and is not well suited to a unified constrained task-level control framework for cooperative robotic systems.

For coordinated multi-arm movements, Khatib et al., demonstrated the augmented object and virtual linkage model (see Literature Reference Nos. 6 and for manipulating objects with multiple arms and controlling internal forces in the system. This was based on the operational space approach. While the augmented object and virtual linkage model were initially implemented using a centralized control structure, the approaches were extended to autonomous mobile manipulation platforms using a decentralized control structure. Decentralized cooperative manipulation for multiple robots has also been investigated using a leader-follower approach (see Literature Reference No. 27). In this approach, the motion command for an object is issued to the leader robot while the other follower robots estimate the motion of the leader independently and manipulate the object based on the estimated reference. No explicit communication exists between the robots, each of which possesses its own controller. The control algorithm also specifies the internal forces on the object. Decentralized control policies have also been investigated for multi-robot manipulation and movement toward a goal position using the concept of object closure (see Literature Reference No. 34).

Impedance control has been used to address the interaction between a robot manipulator and the external environment. Rather than controlling motion explicitly it is often desirable to control the impedance of the manipulator (see Literature Reference Nos. 19 and 20). This is particularly relevant when performing cooperative manipulation with a human.

Musculoskeletal simulations involve modeling the kinematics of the skeletal system, the inertial properties of the body segments, and the forces generated by the muscles. Existing simulations of large biomechanical systems typically make assumptions of a rigid multibody skeletal system actuated by an idealized network of lumped parameter Hill-type muscles (see Literature Reference Nos. 17 and 46). Based on such models a number of musculoskeletal simulation systems have been developed including, Anybody (see Literature Reference No. 8), SIMM (see Literature Reference No. 15), Digital Biomechanics, GaitSym, Life-Modeler (see Literature Reference No. 29), and OpenSim (see Literature Reference No. 14). In addition to lumped parameter muscle models, continuum mechanical models of skeletal muscle have been implemented using the finite element approach (see Literature Reference Nos. 32 and 42). While these models possess higher fidelity in modeling skeletal muscle, they are too computationally expensive for real-time control of a collaborative robot.

Simulated control of large muscle actuated systems has involved the use of dynamic optimization to determine optimal neuromuscular excitations to generate specific motions in musculoskeletal models (see Literature Reference Nos. 1, 9, 23, and 31). In dynamic optimization the objective function is typically a global measure of biomechanical cost. While providing a globally optimal control history over a time window, dynamic optimization offers a number of disadvantages. Foremost, it is an open-loop technique that finds an optimal solution given a forward dynamical model of the biomechanical system. It suffers from sensitivity to model parameters and lack of robustness to disturbances. Additionally, it is computationally expensive. Static optimization using an inverse dynamical model of the biomechanical system (see Literature Reference No. 7) is computationally less demanding and has been shown to produce results for human gait that are practically equivalent to dynamic optimization (see Literature Reference No. 1)

A closed-loop control technique employing static optimization has been proposed and demonstrated (see Literature Reference Nos. 43, and 44). Referred to as computed muscle control (CMC), this technique is analogous to computed torque control (see Literature Reference No. 28) for robotic systems. A desired joint space control trajectory is specified and the necessary control input to the musculoskeletal system is computed. Due to the added complexity of muscle actuated biomechanical systems relative to a torque actuated robotic systems, the computed muscle control technique employs added complexity over computed torque control. This includes a static optimization step to compute optimal steady state muscle activation (consistent with the desired motion) and an excitation controller to account for muscle activation dynamics (i.e. compute excitations that track the optimal steady state muscle activations).

A number of studies have investigated impedance properties in the neuromuscular system (see Literature Reference Nos. 4, 30, 33, 38, and 39). These have primarily focused on generating multi-joint human arm movements using postural force fields. Hogan investigated co-activation of antagonist muscles as a means of controlling mechanical impedance in the human arm (see Literature Reference No. 18). This work provided a great deal of insight into mechanisms for arm control based on mechanical impedance; however, highly simplistic musculoskeletal models were used and whole body impedance in performing tasks was not addressed. Baratta et al., investigated co-activation patterns of the knee flexor and extensor muscles to identify the role of the antagonist muscles in maintaining joint stability (see Literature Reference No. 3). EMG was used to identify simultaneous activation of flexor and extensor muscles during slow isokinetic contractions. It was concluded that co-activation of agonist and antagonist muscles in the knee is necessary to aid the ligaments in maintaining joint stability through the regulation of the joint's mechanical impedance. Gomi and Osu showed that varying co-activation ratios between shoulder and elbow joints produced changes in the shape and orientation of the stiffness ellipse (see Literature Reference No. 16). Tee et al., addressed how humans learn to adapt in the presence of instabilities and disturbances like those experienced in tool use (see Literature Reference No. 41). A simple rule was presented to specify how muscle co-activation is adapted during movement. They demonstrated that a controller could compensate for changing dynamics and noise properties by adapting limb impedance.

In industrial settings direct physical interaction between humans and robots is avoided due to safety issues. The safety issue is a significant obstacle to human robot cooperation. This issue has been dealt with at a hardware level through the development of intrinsically safe robotic structures and actuators (see Literature Reference Nos. 40 and 47). Recent commercial efforts like Rethink Robotics' Baxter are bringing human safe robots into the mainstream. However, while these systems are designed to be safe for humans they are not necessarily intended to physically interact with humans through cooperative manipulation. As noted above, cooperative control between robots and humans has been investigated using impedance control (see Literature Reference No. 22). Specifically, a variable impedance control method was proposed for human-robot cooperation. Impedance characteristics were analyzed in a cooperative task between two humans. The human-human characteristics were represented by a variable impedance model that was implemented in a robot control algorithm. Similar approaches have been used to address human-robot cooperation (see Literature Reference No. 45).

While several techniques have been devised to control robots, nothing heretofore devised has provided an effective solution to the next generation of robotic control that is responsive and tuned to the individual human. Thus, a continuing need exists for a robot control system that combines modeling and online simulation of human biomechanics with whole body robot control to create robots that understand human musculoskeletal limitations and ergonomic issues when collaborating with humans on tasks (e.g. coordinated manipulation of heavy objects).

SUMMARY OF INVENTION

This disclosure provides a system for co-adaptation of robot control to human biomechanics. In some embodiments, the system includes one or more processors and a memory. The memory is a non-transitory computer-readable medium having executable instructions encoded thereon, such that upon execution of the instructions, the one or more processors perform operations of receiving joint angle and joint velocity of a human and co-robot; generating estimated internal states of the human; generating a task space motion plan for the co-robot based on a specified cooperative task and estimated internal states and joint angle and joint velocity of the human; generating joint torque commands based on the task space motion plan and joint angle and joint velocity of the human and co-robot; and causing the co-robot to actuate one or more actuators to move based on the joint torque commands.

In another aspect, the joint torque commands are generated in real-time based on real-time motion of a human and co-robot.

In yet another aspect, the estimated internal states of the human are generated by an online biomechanical simulation subsystem using stiff tendon muscle modeling and simulation.

In another aspect, the estimated internal states of the human are generated by an online biomechanical simulation subsystem using a physics-based musculoskeletal simulation environment.

Additionally, the joint torque commands are generated based on impedance sensing and control.

Further, the joint angles and joint velocities of the human are estimated based on kinematic measurement of the human using vision-based sensing on board the co-robot.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
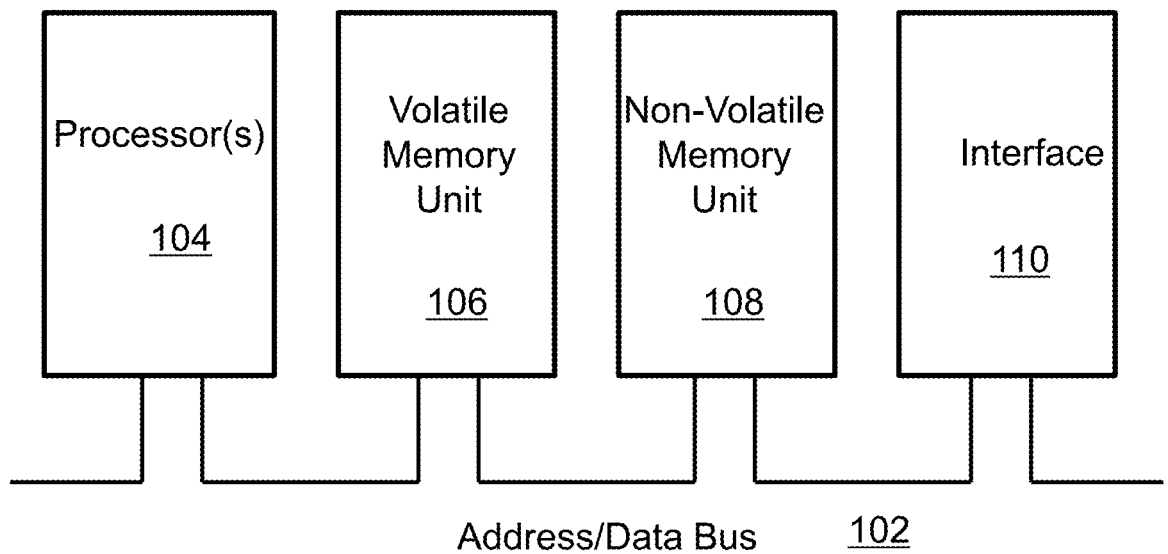
FIG. 1 is a block diagram depicting the components of a system according to various embodiments of the present invention.
Figure 1:
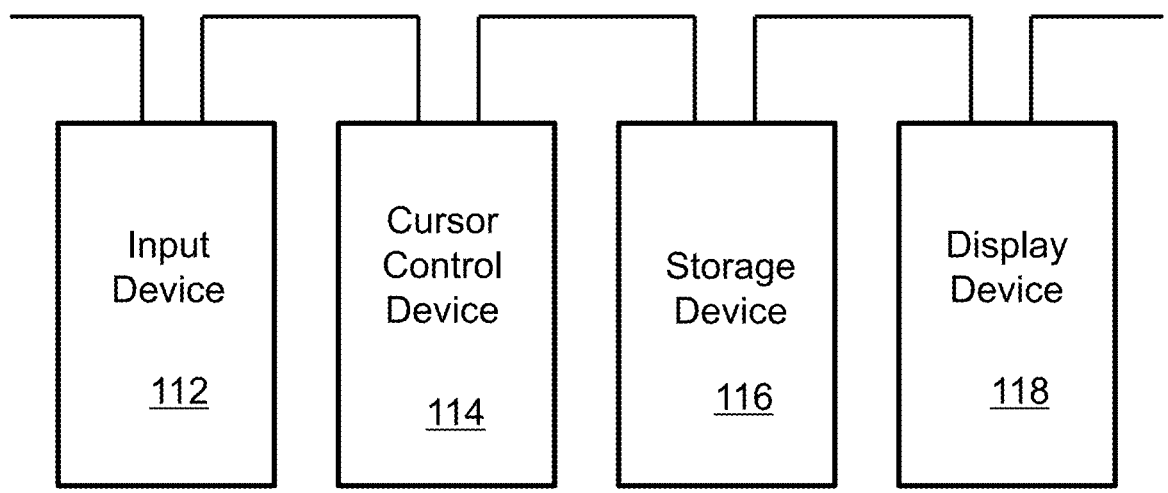

The present invention relates to robot control system and, more specifically, to a system for co-adaptation of robot control to human biomechanics. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Anderson, F. C., & Pandy, M. G. (2001). Dynamic Optimization of Human Walking. *Journal Biomechanical Engineering,* 123 (5), 381-390.
2. Anderson, F. C., & Pandy, M. G. (2001). Static and dynamic optimization solutions for gait are practically equivalent. *Journal of Biomechanics,* 34, 153-161.
3. Baratta, R., Solomonow, M., Zhou, B. H., Letson, D., Chuinard, R., & R., D. (1988). Muscular coactivation. The role of the antagonist musculature in maintaining knee stability. *The American Journal of Sports Medicine,* 16 (2), 113-122.
4. Bizzi, E., Mussa-Ivaldi, F., & Giszter, S. (1991). Computations underlying the execution of movement: A biological perspective. *Science,* 253, 287-291.
5. Bunderson, N. E., Bingham, J. T., Sohn, M. H., Ting, L. H., & Burkholder, T. J. (2012). Neuromechanic: A computational platform for simulation and analysis of the neural control of movement. *International Journal for Numerical Methods in Biomedical Engineering,* 28 (10), 1015-1027.
6. Chang, K.-S., Holmberg, R., & Khatib, O. (2000). The augmented object model: cooperative manipulation and parallel mechanism dynamics. *Proceedings of the IEEE International Conference on Robotics and Automation,* 1, pp. 470-475.
7. Crowninshield, R. D., & Brand, R. A. (1981). A physiologically based criterion of muscle force prediction in locomotion. *JOURNAL of Biomechanics,* 14, 793-801.
8. Damsgaard, M., Rasmussen, J., Christensen, S., Surma, E., & de Zee, M. (2006). Analysis of musculoskeletal systems in the AnyBody Modeling System. *Simulation Modelling Practice and Theory,* 14, 1100-1111.
9. Davy, D. T., & Audu, M. L. (1987). A dynamic optimization technique for predicting muscle forces in the swing phase of gait. *Journal of Biomechanics,* 20 (2), 187-201.
10. De Sapio, V. (2014). An approach for goal-oriented neuromuscular control of digital humans in physics-based simulations. *International Journal of Human Factors Modelling and Simulation,* 4 (2), 121-144.
11. De Sapio, V. (2011). Task-level control of motion and constraint forces in holonomically constrained robotic systems. *Proceedings of the 18th World Congress of the International Federation of Automatic Control.* Milan.
12. De Sapio, V., & Park, J. (2010). Multitask constrained motion control using a mass-weighted orthogonal decomposition. *Journal of Applied Mechanics,* 77 (4), 10 pp.
13. De Sapio, V., & Srinivasa, N. (2015). A methodology for controlling motion and constraint forces in holonomically constrained systems. *Multibody System Dynamics,* 33, 179-204.
14. Delp, S. L., Anderson, F. C., Arnold, S., A., Loan, P., Habib, A., et al. (2007). OpenSim: Open-source software to create and analyze dynamic simulations of movement. *IEEE Transactions on Biomedical Engineering,* 54 (11), 1940-1950.
15. Delp, S. L., Loan, J. P., Hoy, M. G., Zajac, F. E., Topp, E. L., & Rosen, J. M. (1990). An interactive graphics-based model of the lower extremity to study orthopaedic surgical procedures. *IEEE Transactions on Biomedical Engineering,* 37, 757-767.
16. Gomi, H., & Osu, R. (1998). Task-Dependent Viscoelasticity of Human Multijoint Arm and Its Spatial Characteristics for Interaction with Environments. *The Journal of Neuroscience*, 18 (21), 8965-8978.
17. Hill, A. V. (1938). The heat of shortening and dynamics constants of muscles. *Proceedings of the Royal Society B*, 126 (843), 136-195.
18. Hogan, N. (1984). Adaptive Control of Mechanical Impedance by Coactivation of Antagonist Muscles. *IEEE Transactions on Automatic Control*, 29 (8), 681-690.
19. Hogan, N. (1985). Impedance Control: An Approach to Manipulation (Parts I, II, and III). *Journal of Dynamic Systems, Measurement, and Control*, 107, 1-24.
20. Hogan, N. (1987). Stable execution of contact tasks using impedance control. *Proceedings of the 1987 IEEE International Conference on Robotics and Automation*, 4, pp. 1047-1054.
21. Huston, R. L., Liu, C. Q., & Li, F. (2003). Equivalent control of constrained multibody systems. *Multibody System Dynamics*, 10 (3), 313-321.
22. Ikeura, R., & Inooka, H. (1995). Variable Impedance Control of a Robot for Cooperation with a Human. *Proceedings of the 1995 IEEE International Conference on Robotics and Automation*, 3, pp. 3097-3102.
23. Kaplan, M. L., & Heegaard, J. H. (2001). Predictive algorithms for neuromuscular control of human locomotion. *Journal of Biomechanics*, 34, 1077-1083.
24. Khatib, O. (1987). A unified approach to motion and force control of robot manipulators: the operational space formulation. *International Journal of Robotics Research*, 3 (1), 43-53.
25. Khatib, O. (1995). Inertial properties in robotic manipulation: an object level framework. *International Journal of Robotics Research*, 14 (1), 19-36.
26. Khatib, O., Yokoi, K., Chang, K., Ruspini, D. C., Holmberg, R., Casal, A., et al. (1995). Force Strategies for Cooperative Tasks in Multiple Mobile Manipulation Systems. *Proceedings of the International Symposium on Robotics Research*, (pp. 333-342).
27. Kosuge, K., & Oosumi, T. (1996). Decentralized control of multiple robots handling an object. *Proceedings of the 1996 IEEE/RSJ International Conference on Intelligent Robots and Systems*, 1, pp. 318-323.
28. Lewis, F. L., Abdallah, C. T., & Dawson, D. M. (1993). *Control of Robot Manipulators*. New York: Macmillan Publishing Company.
29. McGuan, S. (2001). From Bubblemen to Skeletons. SAE Digital Human Modeling for Design and Engineering Conference.
30. Mussa-Ivaldi, F. A., Hogan, N., & Bizzi, E. (1985). Neural, mechanical and geometric factors subserving arm posture in humans. *Journal of Neuroscience*, 5, 2732-2743.
31. Neptune, R. R. (1999). Optimization algorithm performance in determining optimal controls in human movement analyses. *Journal of Biomechanical Engineering*, 121, 249-252.
32. Oomens, C. W., Maenhout, M., van Oijen, C. H., Drost, M. R., & Baaijens, F. P. (2003). Finite element modelling of contracting skeletal muscle. *Philosophical Transactions of the Royal Society B*, 358 (1437), 1453-1460.
33. Patton, J. L., & Mussa-Ivaldi, F. A. (2002). Patton, J. L., & Mussa-Ivaldi, F. A. (2002). Linear combinations of nonlinear models for predicting human-machine interface forces. *Biological Cybernetics*, 86, 73-87.
34. Pereira, G. A., Kumar, V., & Campos, M. F. (2004). Decentralized Algorithms for Multirobot Manipulation Via Caging. *International Journal of Robotics Research*, 23 (7-8), 783-795.
35. Sentis, L. (2010). Compliant Control of Whole-body Multi-contact Behaviors in Humanoid Robots. In K. Harada, E. Yoshida, & K. Yokoi (Eds.), *Motion Planning for Humanoid Robots* (pp. 29-66). Springer.
36. Sentis, L., & Khatib, O. (2006). A Whole-Body Control Framework for Humanoids Operating in Human Environments. *Proceedings of the 2006 IEEE International Conference on Robotics and Automation*. Orlando.
37. Sentis, L., & Khatib, O. (2005). Synthesis of Whole-body Behaviors Through Hierarchical Control of Behavioral Primitives. *International Journal of Humanoid Robotics*, 2 (4), 505-518.
38. Shadmehr, R. (1993). Control of equilibrium position and stiffness through postural modules. *Journal of Motor Behavior*, 25 (3), 228-241.
39. Shadmehr, R., Mussa-Ivaldi, F. A., & E., B. (1993). Postural force fields of the human arm and their role in generating multi-joint movements. *Journal of Neuroscience*, 13 (1), 45-62.
40. Shin, D., Quek, Z. F., Phan, S., Cutkosky, M. R., & Khatib, O. (2011). Instantaneous Stiffness Effects on Impact Forces in Human-Friendly Robots. *Proceedings of the 2011 IEEE/RSJ International Conference on Intelligent Robots and Systems*, (pp. 2998-3003). San Francisco.
41. Tee, K. P., Franklin, D. W., Kawato, M., Milner, T. E., & Burdet, E. (2010). Concurrent adaptation of force and impedance in the redundant muscle system. *Biological Cybernetics*, 102 (1), 31-44.
42. Teran, J., S. Blemker, S., Ng Thow Hing, V., & Fedkiw, R. (2003). Finite Volume Methods for the Simulation of Skeletal Muscle. *Eurographics/SIGGRAPH Symposium on Computer Animation*.
43. Thelen, D. G., & Anderson, F. C. (2006). Using computed muscle control to generate forward dynamic simulations of human walking from experimental data. *Journal of Biomechanics*, 39, 1107-1115.
44. Thelen, D. G., Anderson, F. C., & Delp, S. L. (2003). Generating dynamic simulations of movement using computed muscle control. *Journal of Biomechanics*, 36 (3), 321-328.
45. Tsumugiwa, T., Yokogawa, R., & Hara, K. (2002). Variable impedance control based on estimation of human arm stiffness for human-robot cooperative calligraphic task. *Proceedings of the 2002 IEEE International Conference on Robotics and Automation*, 1, pp. 644-650.
46. Zajac, F. E. (1993). Muscle coordination of movement: A perspective. *Journal of Biomechanics*, 26 (1), 109-124.
47. Zinn, M., Khatib, O., Roth, B., & Salisbury, J. K. (2004, June). Playing It Safe: A New Actuation Concept for Human-Friendly Robot Design. *IEEE Robotics and Automation Magazine*, 11 (2), pp. 12-21.
48. Stroupe, A., Huntsberger, T., Okon, A., Aghazarian, H., & Robinson, M. (2005). Behavior-based multi-robot collaboration for autonomous construction tasks. *Proceedings of the 2005 IEEE/RSJ International Conference on Intelligent Robots and Systems*, (pp. 1495-1500).
49. Roetenberg, D., Luinge, H., & Slycke, P. (2009). Xsens MVN: full 6DOF human motion tracking using miniature inertial sensors. Xsens Technologies.

(2) PRINCIPAL ASPECTS

Various embodiments of the invention include three "principal" aspects. The first is a system for robot control. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
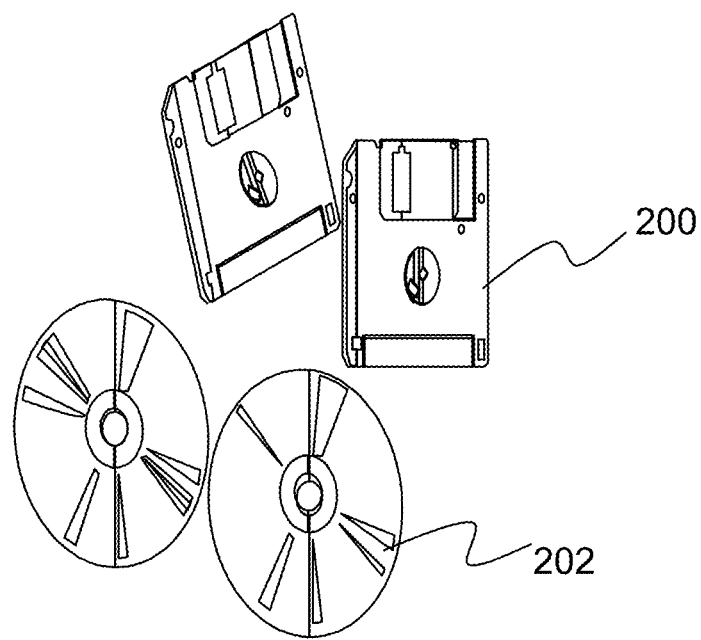
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

Figure 3:
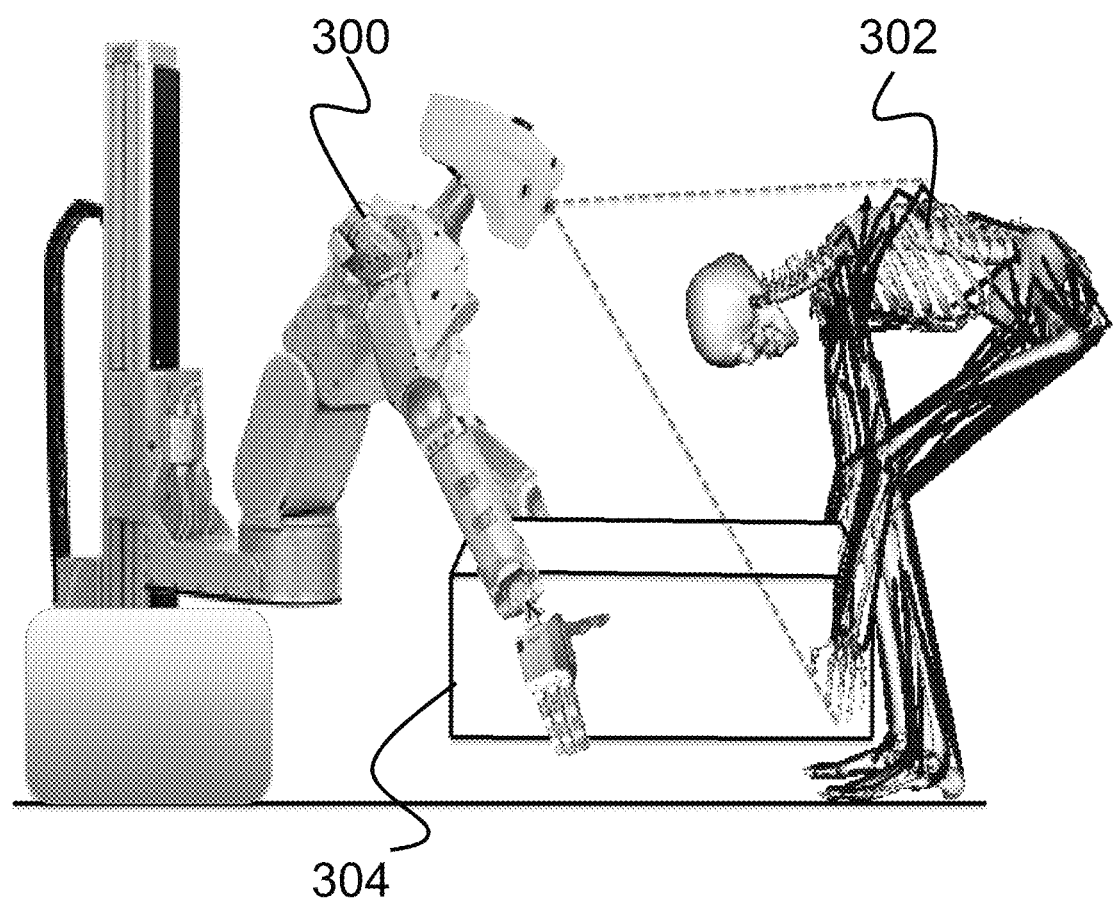
FIG. 3. is a depiction of the control framework for human-robot collaboration, enabling helper robots that take into account human biomechanical constraints to mitigate ergonomic problems.

This disclosure describes a new framework for controlling robots that collaborate with humans; one that takes into account human biomechanical capabilities and limitations. Current frameworks use contact alone as a constraint for control in cooperative tasks. However, this neglects important information about the human physiological structure and the complex interplay of muscles spanning the skeletal system. As shown in FIG. 3, using biomechanical properties as constraints, this approach can enable a robot 300 to collaborate with a human 302, (e.g., in carrying a heavy object 304), while simultaneously taking into account human ergonomic limitations and potential injury risks. For example, the robot could hold and lift a heavy object in such a way that the load on the lower back of the collaborating human is minimal. Such human-robot collaboration holds the promise of improving worker safety and reducing health care costs due to overexertion injuries.

A purpose of this invention is to provide a more effective and safe solution to the problem of robots involved in performing cooperative tasks with human counterparts. A unique aspect of the present system is the inclusion of human biomechanics in closed loop control with a robot. In biomechanical engineering, computational models of human dynamics have been studied, but those models have not been linked to robotic control. This approach tightly integrates robotic control with human biomechanics in closed loop. It addresses how a controlled engineered system (robot) interfaces with a physically connected biological system (human) that is itself controlled (rather than passive) independently. The present invention addresses the unique problem of how the engineered control system must monitor, infer, and anticipate the behavior of a biological system to optimally and safely collaborate with the biological system.

This approach represents a more unified way of analyzing human-robot collaboration, which will help to avoid control problems. For example, the Jet Propulsion Laboratory experimented with robots collaborating for carrying a beam (see Literature Reference No. 48) but oscillations arising from force feedback between the robots made this task challenging. On the sensor processing side, novel algorithms and methods are specified that exploit human biomechanics for human posture estimation. The state of the art in tracking uses constraints from human skeletal kinematics (see Literature Reference No. 49) but omits the muscle dynamics. Including such dynamics in the present system will further constrain the search space for tracking and, thus, improve its accuracy.

The development of improved human-machine interfaces has several applications, both in vehicle/aircraft interface design as well as manufacturing process design involving robotic systems to enhance human performance. This invention offers transformative capabilities for the development of next generation human-machine interfaces that have the potential to improve operator performance, as well as factory floor safety and productivity.

(4) SPECIFIC DETAILS OF VARIOUS EMBODIMENTS

As noted above, this disclosure is directed to a framework for controlling robots that collaborate with humans. For robots interacting with humans for cooperative manipulation, a control policy needs to be generated for the robot without knowing or being able to influence the control policy of the human (the human nervous system is decoupled from the robot control system). The present disclosure specifies online motion capture for posture monitoring of the human. Thus, part of the human's biomechanical state can be measured. There are other critical hidden states (and other hidden variables) that cannot be observed by the robot. These include muscle activation, muscle and tendon lengths, muscle/tendon force and strain, muscle moment arms and moments about joints, joint reaction forces, energy expenditure etc. The system and process detailed here provides a basis for synthesizing robot control that optimizes human performance, comfort, and safety, by continually monitoring these variables during task execution and providing the proper control responses for the robot to interact with the human.

Figure 4:
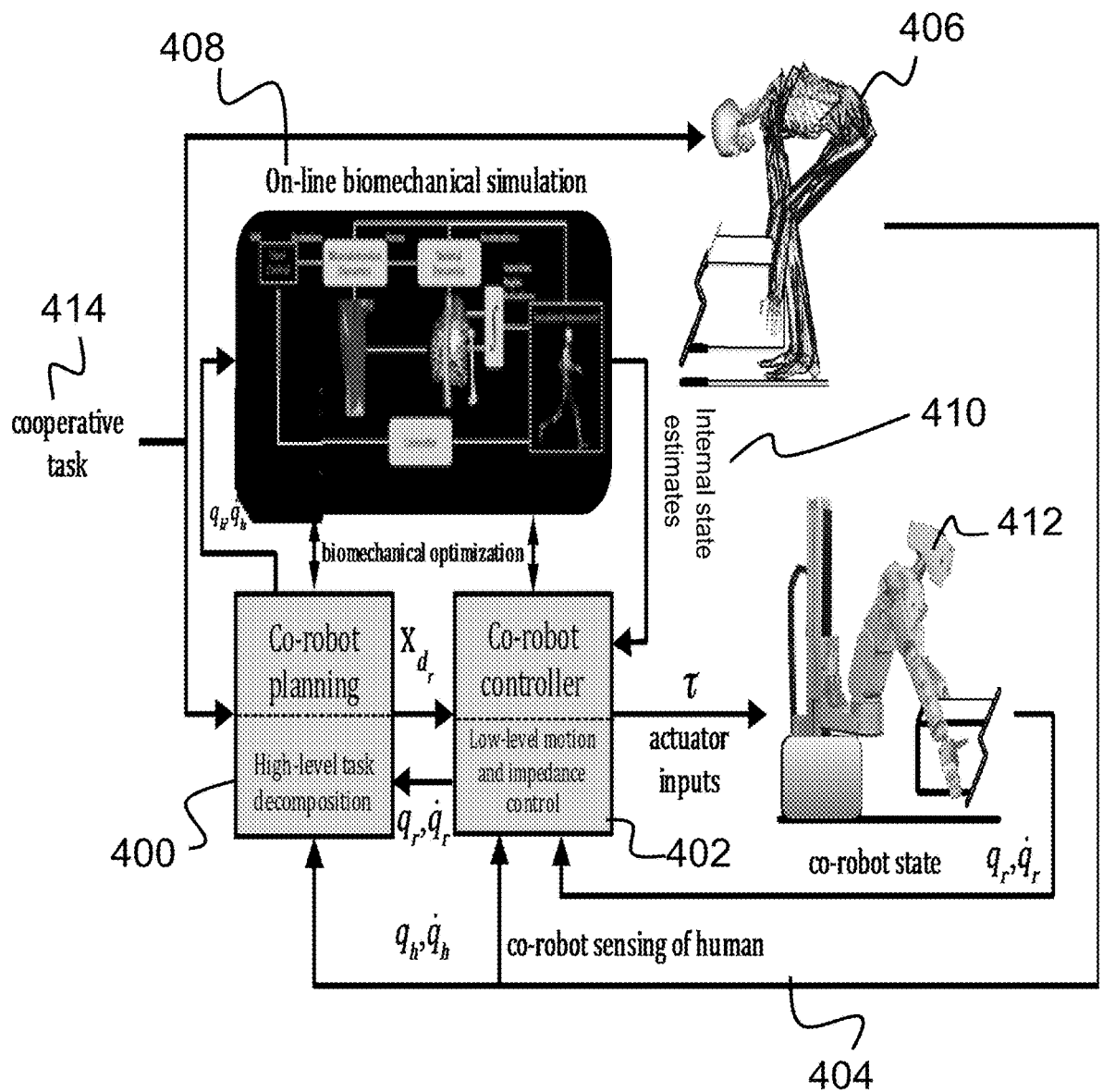
FIG. 4 is a schematic of a closed loop controller with a robot and human, where the robot considers the physical limitations of the human using a real-time biomechanical simulation, and the controller receives as input the state (position and velocity of joints) of the robot and the human.

The system-level control architecture, with human and robot in a loop, is shown in FIG. 4. The co-robot planning 400 and controller 402 subsystems receive the state 404 (angle and velocity of the joints, $q_h$ and $\dot{q}_h$) of the human 406 as input (via sensors, such as a video camera). The co-robot planning 400 subsystem then generates a task-level command input ($x_{d_r}$). This input provides a representation of the desired motion in coordinates relevant to the environment (e.g., Cartesian coordinates). This input generation uses the online biomechanical simulation subsystem 408 to generate a high-level goal-oriented plan for the co-robot that is consistent with optimizing human performance, comfort, and safety in cooperative tasks. Based on the task-level command input ($x_{d_r}$) from the co-robot planning 400 subsystem and the state 404 of the human 406, the co-robot controller 402 subsystem generates low-level control inputs (e.g., actuator torques) for the co-robot, e.g., using constrained motion and force control as specified in Literature Reference No. 13 and U.S. Pat. No. 9,364,951 (both of which are incorporated by reference as though fully set forth herein).

The present system also includes an online biomechanical simulation subsystem 408. The online biomechanical simulation subsystem 408 generates a physics-based musculoskeletal model/simulation of the human in the loop. OpenSim (see Literature Reference No. 14) and other biomechanical simulation engines are suitable for this purpose. However, simulation engines like OpenSim do not currently execute neuromuscular control and forward dynamics computations of the simulated human in real-time. Instead, the stiff tendon approach for modeling muscle (see Literature Reference No. 10) allows real-time execution of the neuromuscular control and forward dynamics computations of the human simulation. The joint angles and joint velocities of the human ($q_h$ and $\dot{q}_h$) are estimated based on kinematic measurement of the human body, using vision-based sensing of the co-robot. It should be noted that the vision-based sensing could be mounted on or off board the robot. These are then fed to the online biomechanical simulation subsystem 408.

The joint angles and joint velocities of the robot ($q_r$ and $\dot{q}_r$, measured by internal joint encoders) and human ($q_h$ and $\dot{q}_h$, measured by the vision-based sensing (on board or off board) of the co-robot) are inputs to the co-robot controller 402 subsystem. The co-robot controller 402 also receives estimates of the internal states 410 of the human body, comprising muscle excitation, u, muscle activation, a, muscle lengths, $l_m$, muscle forces, etc. These internal states 410 are generated by the online biomechanical simulation subsystem 408 given the measured joint angles and joint velocities of the human 406. Low-level control of the co-robot 412 is executed by the co-robot controller 402.

A third subsystem, the co-robot planning subsystem 400, performs high-level task space planning for the co-robot 412 based on the human's 406 behavior. Existing robot motion planners and optimization tools are suitable for this purpose. Non-limiting examples of such robot motion planners and optimization tools include rapidly-exploring random trees and probabilistic roadmaps. The co-robot planning subsystem 400 takes estimates of the joint angles and joint velocities of the human 406 ($q_h$ and $\dot{q}_h$, measured by the vision-based sensing (on board or off board) of the co-robot 412) as well as the internal states 410 of the human body, generated by the online biomechanical simulation subsystem 408, as input. Using the online biomechanical simulation subsystem 408, it then generates a high-level goal-oriented motion plan for the co-robot 412 that is consistent with optimizing human performance, comfort, and safety in cooperative tasks 414. The objective function used to generate the optimized plan can involve any number of biomechanical variables including, but not limited to, muscle activation, muscle and tendon lengths, muscle/tendon force and strain, muscle moment arms and moments about joints, joint reaction forces, and energy expenditure.

Figure 5:
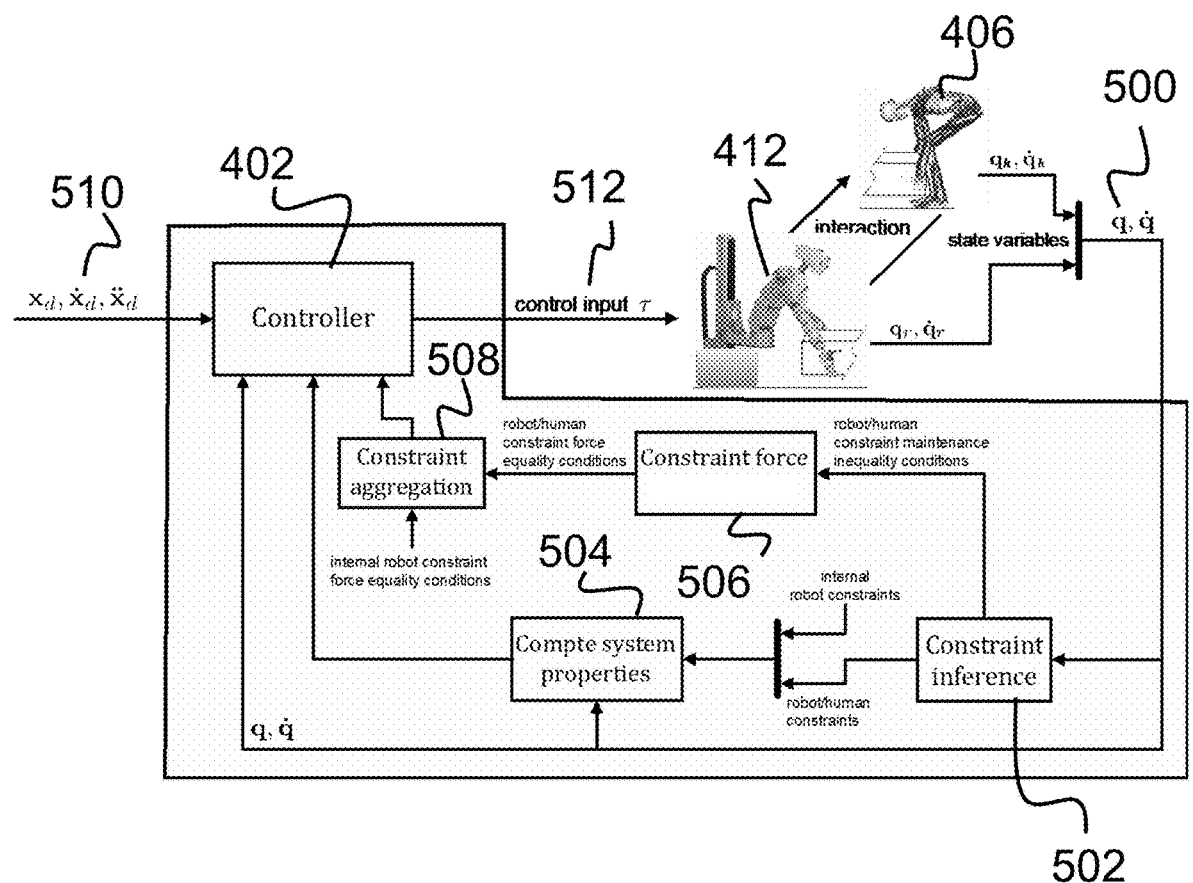
FIG. 5 is a schematic of a system-level implementation for task-level constrained motion and force control extended to the co-robot/human system interaction.

The framework of the co-robot controller 402 subsystem is based on using constrained motion and force control as specified in Literature Reference No. 13 and U.S. Pat. No. 9,364,951 (both of which are incorporated by reference as though fully set forth herein). This approach is extended in the present system to a coupled human-robot system rather than just a robot coupled to the environment. For example, FIG. 5 depicts a system-level diagram for task-level constrained motion and force control of a robot 412 interacting with a human 412. The kinematic state 500 consists of the joint angles and velocities, q and $\dot{q}$, of the combined robot-human system. The mechanical impedance for each joint of the human 406 is inferred from the biomechanical state of the human 406 and impedance sensing made by the co-robot 412 through the object being cooperatively manipulated.

At each time step, unilateral constraints associated with the co-robot/human interaction are inferred (i.e., constraint inference 502) from the sensed state of the interaction (using the vision-based sensing on board the co-robot 412 or, in other aspects, the vision-based sensing could be off board (e.g., a tripod standing in a room, etc.)). These constraints 502 are aggregated with the known internal (bilateral) mechanism constraints of the co-robot 412, and the properties 504 associated with the constrained dynamics, as defined in Literature Reference No. 13 and U.S. Pat. No. 9,364,951) of the robot/human system are computed and sent to the controller. A set of equality conditions (i.e., constraint force 506) on the co-robot/human constraint (interaction forces) are specified that satisfy the inequality conditions associated with maintaining desired co-robot/human interactions (e.g., cooperatively holding onto an object, releasing an object, maintaining contact with surfaces). For example, for a co-robot grasping an object, the constraint forces on the co-robot hands must be specified to be great enough such that the hand does not lose grasp of the object. (see Literature Reference No. 13).

These conditions are aggregated 508 with any control conditions on the internal mechanism constraints of the co-robot 412 and sent to the controller 402. The resulting conditions on the constraint forces, along with the specified task space motion commands 510 (from the co-robot planning subsystem) are used by the controller 402 to compute the control input (joint torques) 512 to the co-robot 412. The control input or joint torques 512 are actuator commands to cause the co-robot 412 to move as specified per the joint torques 512. For example, the command may cause a joint to rotate 30 degrees at a specified speed to match the human 406 and, in doing so, to lift an object three feet per a particular task command.

Figure 6:
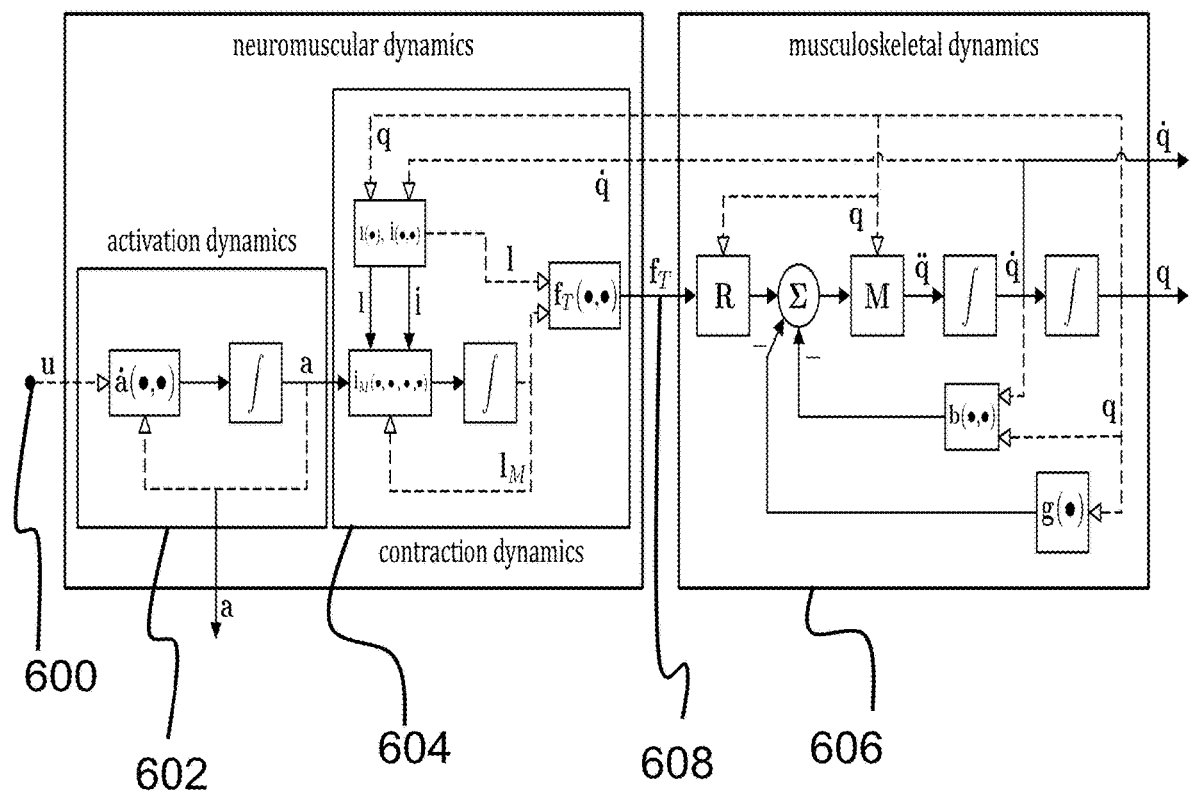
FIG. 6 is a system-level depiction of neuromechanical dynamics (muscle activation dynamics, contraction dynamics, and musculoskeletal dynamics) of a human.

As noted above, the system of the present disclosure also includes an online biomechanical simulation subsystem 408. The neuromechanical dynamics (muscle activation dynamics, contraction dynamics, and musculoskeletal dynamics) of such an online biomechanical simulation subsystem 408 are depicted in FIG. 6. Specifically, FIG. 6 is a system-level depiction of neuromechanical dynamics of a human, illustrating that the neural excitations 600 provide input to the activation dynamics 602, the output of the activation dynamics 602 provides input to the contraction dynamics 604, and the output of the contraction dynamics 604 provides input to the musculoskeletal dynamics 606 through the tendon forces 608.

The neuromechanical state of the human includes not only the generalized coordinates and velocities, q and $\dot{q}$, describing the human configuration but also the muscle activations, a, and the muscle lengths, $l_M$. The neural excitations 600 to the muscles, u, serve as the input signal. The efficacy of this state space representation for the human is identified in Bunderson et al. (see Literature Reference No. 5) where it is noted that inclusion of all state dependencies allows computation of system derivatives and allows analysis and optimization of kinematic and muscle states.

In addition to the feed-forward neuromechanical dynamics described in FIG. 6, a feedback controller is needed to generate neural excitation commands 600 given joint angle reference inputs. The feedback controller drives the system of FIG. 6 by generating neural excitation 600 based on state measurements. The computed muscle controller (CMC) serves this purpose, however, it is not able to execute in real-time on current computer hardware. For real-time computational performance, the assumption is made in this invention that the tendons are infinitely stiff. In this case $l_M$ is no longer an independent state, but rather, it is algebraically related to the overall musculo-tendon length, l(q).

Figure 7:
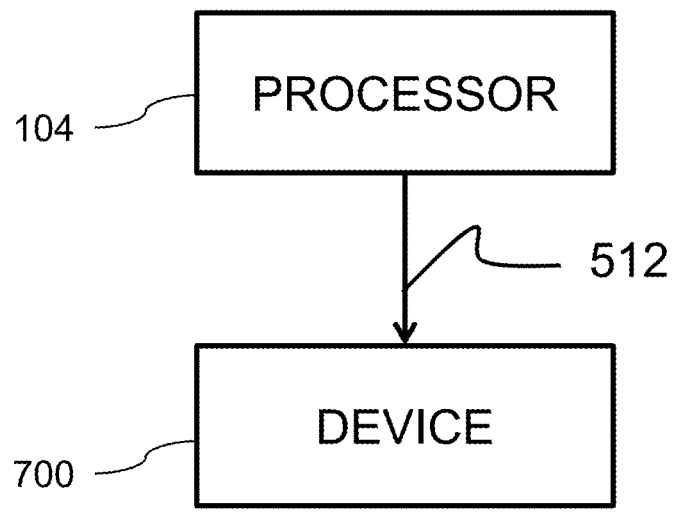
FIG. 7 is a block diagram depicting control of a device according to various embodiments.

As shown in FIG. 7, a processor 104 may be used to control a device 700 (e.g., the co-robot) based on the control input (joint torques) 512. The control of the device 500 may be used to cause the co-robot to perform any specified task or command to assist the human. For example and as understood by those skilled in the art, there are a variety of human assistive applications including but not limited to factory floor human-robot cooperative assembly of products. and helper robots for manual labor (construction, furniture moving, etc.).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for co-adaptation of robot control to human biomechanics, the system comprising:
    one or more processors and a memory, the memory being a non-transitory computer-readable medium having executable instructions encoded thereon, such that upon execution of the instructions, the one or more processors perform operations of:
        receiving joint angle and joint velocity of a human and co-robot;
        generating estimated internal states of the human;
        generating a task space motion plan for the co-robot based on a specified cooperative task and estimated internal states and joint angle and joint velocity of the human;
        generating joint torque commands based on the task space motion plan and joint angle and joint velocity of the human and co-robot; and
        causing the co-robot to actuate one or more actuators to move based on the joint torque commands.

2. The system as set forth in claim 1, wherein the joint torque commands are generated in real-time based on real-time motion of a human and co-robot.

3. The system as set forth in claim 1, wherein the estimated internal states of the human are generated by an online biomechanical simulation subsystem using stiff tendon muscle modeling and simulation.

4. The system as set forth in claim 1, wherein the estimated internal states of the human are generated by an online biomechanical simulation subsystem using a physics-based musculoskeletal simulation environment.

5. The system as set forth in claim 1, wherein the joint torque commands are generated based on impedance sensing and control.

6. The system as set forth in claim 1, wherein the joint angles and joint velocities of the human are estimated based on kinematic measurement of the human using vision-based sensing on board the co-robot.

7. The system as set forth in claim 1, wherein the joint torque commands are generated in real-time based on real-time motion of a human and co-robot;
    wherein the estimated internal states of the human are generated by an online biomechanical simulation subsystem using stiff tendon muscle modeling and simulation;
    wherein the estimated internal states of the human are generated by an online biomechanical simulation subsystem using a physics-based musculoskeletal simulation environment;
    wherein the joint torque commands are generated based on impedance sensing and control; and
    wherein the joint angles and joint velocities of the human are estimated based on kinematic measurement of the human using vision-based sensing on board the co-robot.

8. A non-transitory computer-readable storage medium storing thereon a computer program product for co-adaptation of robot control to human biomechanics, the computer program product comprising executable instructions such that upon execution of the instructions by one or more processors, the one or more processors perform operations of:
    receiving joint angle and joint velocity of a human and co-robot;
    generating estimated internal states of the human;
    generating a task space motion plan for the co-robot based on a specified cooperative task and estimated internal states and joint angle and joint velocity of the human;
    generating joint torque commands based on the task space motion plan and joint angle and joint velocity of the human and co-robot; and
    causing the co-robot to actuate one or more actuators to move based on the joint torque commands.

9. The computer computer-readable storage medium as set forth in claim 8, wherein the joint torque commands are generated in real-time based on real-time motion of a human and co-robot.

10. The computer computer-readable storage medium as set forth in claim 8, wherein the estimated internal states of the human are generated by an online biomechanical simulation subsystem using stiff tendon muscle modeling and simulation.

11. The computer computer-readable storage medium as set forth in claim 8, wherein the estimated internal states of the human are generated by an online biomechanical simulation subsystem using a physics-based musculoskeletal simulation environment.

12. The computer computer-readable storage medium as set forth in claim 8, wherein the joint torque commands are generated based on impedance sensing and control.

13. The computer computer-readable storage medium as set forth in claim 8, wherein the joint angles and joint velocities of the human are estimated based on kinematic measurement of the human using vision-based sensing on board the co-robot.

14. The computer computer-readable storage medium as set forth in claim 8, wherein the joint torque commands are generated in real-time based on real-time motion of a human and co-robot;
    wherein the estimated internal states of the human are generated by an online biomechanical simulation subsystem using stiff tendon muscle modeling and simulation;
    wherein the estimated internal states of the human are generated by an online biomechanical simulation subsystem using a physics-based musculoskeletal simulation environment;
    wherein the joint torque commands are generated based on impedance sensing and control; and
    wherein the joint angles and joint velocities of the human are estimated based on kinematic measurement of the human using vision-based sensing on board the co-robot.

15. A computer implemented method for co-adaptation of robot control to human biomechanics, the method comprising an act of:
- causing one or more processers to execute instructions encoded on a non-transitory computer-readable medium, such that upon execution, the one or more processors perform operations of:
  - receiving joint angle and joint velocity of a human and co-robot;
  - generating estimated internal states of the human;
  - generating a task space motion plan for the co-robot based on a specified cooperative task and estimated internal states and joint angle and joint velocity of the human;
  - generating joint torque commands based on the task space motion plan and joint angle and joint velocity of the human and co-robot; and
  - causing the co-robot to actuate one or more actuators to move based on the joint torque commands.

16. The method as set forth in claim 15, wherein the joint torque commands are generated in real-time based on real-time motion of a human and co-robot.

17. The method as set forth in claim 15, wherein the estimated internal states of the human are generated by an online biomechanical simulation subsystem using stiff tendon muscle modeling and simulation.

18. The method as set forth in claim 15, wherein the estimated internal states of the human are generated by an online biomechanical simulation subsystem using a physics-based musculoskeletal simulation environment.

19. The method as set forth in claim 15, wherein the joint torque commands are generated based on impedance sensing and control.

20. The method as set forth in claim 15, wherein the joint angles and joint velocities of the human are estimated based on kinematic measurement of the human using vision-based sensing on board the co-robot.

21. The method as set forth in claim 15, wherein the joint torque commands are generated in real-time based on real-time motion of a human and co-robot;
- wherein the estimated internal states of the human are generated by an online biomechanical simulation subsystem using stiff tendon muscle modeling and simulation;
- wherein the estimated internal states of the human are generated by an online biomechanical simulation subsystem using a physics-based musculoskeletal simulation environment;
- wherein the joint torque commands are generated based on impedance sensing and control; and
- wherein the joint angles and joint velocities of the human are estimated based on kinematic measurement of the human using vision-based sensing on board the co-robot.

* * * * *